Figure 1:
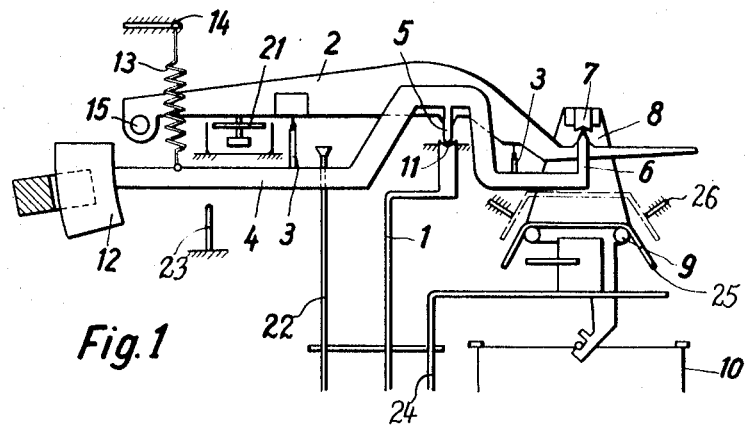

United States Patent

[11] 3,587,762

| [72] | Inventor | Adolf Ast |
| | | Messtetten, Germany |
| [21] | Appl. No. | 769,652 |
| [22] | Filed | Oct. 22, 1968 |
| [45] | Patented | June 28, 1971 |
| [73] | Assignee | August Sauter KG |
| [32] | Priority | Oct. 25, 1967 |
| [33] | | Germany |
| [31] | | S112569 |

[54] WEIGHING BALANCES
10 Claims, 3 Drawing Figs.

[52] U.S. Cl. .................................................. 177/203,
177/246, 177/256
[51] Int. Cl. ...................................................... G01g 21/16,
G01g 1/18

[50] Field of Search ...................................... 177/203,
204, 246, 237, 256—259, 158

[56] References Cited
UNITED STATES PATENTS

| 1,782,654 | 11/1930 | Jaenichen .................... | 177/203 |
| 1,811,831 | 6/1931 | King ............................. | 177/203X |
| 1,869,425 | 8/1932 | Hurt ............................. | 177/203 |
| 2,001,905 | 5/1935 | Hem ............................. | 177/203X |
| 3,299,977 | 1/1967 | Melendy ....................... | 177/158 |

*Primary Examiner*—Robert S. Ward, Jr.
*Attorney*—Werner W. Kleeman

ABSTRACT: An analytical balance is provided with a coarse-weighing beam and a fine-weighing beam which are caused to move together during coarse weighing.

Inventor:
ADOLF AST

Attorneys
Jacobi & Davidson

WEIGHING BALANCES

This invention relates to weighing balances, such as analytical balances, of the kind which have both a coarse-weighing beam and a fine-weighing beam.

In one known balance of this kind, when coarse or preliminary weighing is required, a linkage is operated to change the load pan over from the fine-weighing beam to the coarse-weighing beam. This involves an expensive construction and, in use, coarse and fine readings must be taken in two different places. Also, the fact that the coarse-weighing beam is located below the load pan makes it difficult to read the coarse-weighing beam.

According to one aspect, the present invention consists in a weighing balance comprising a coarse-weighing beam, for preliminary weighing, and a fine-weighing beam, for subsequent precision weighing, the two beams conjointly forming a single rigid balance beam unit when the balance is arranged for preliminary weighing.

In a preferred construction, the coarse-weighing beam pivotally rests on a vertically adjustable seat and has supports on which the fine-weighing beam rests relatively immovably when the vertically adjustable seat is raised to lift the coarse-weighing beam to a pivotal position for preliminary weighing, a relatively fixed seat being provided on which the fine-weighing beam pivotally rests when the vertically adjustable seat is lowered to free the fine-weighing beam for precision weighing.

The coarse-weighing beam may be pivoted by knife edges in notched seats and thus given considerable protection against vibrations and impacts. If the load arm of the coarse-weighing beam is of the same length as the load arm of the fine weighing beam, no further pivots are required, the total friction is therefore reduced and greater accuracy is achieved.

During preliminary weighing, the fine-weighing beam is borne by three supports, on the coarse-weighing beam, and its pivotal knife edges are raised clear of flat seats so that they suffer less wear and tear, are more accurate, and have a longer life than previously. When the balance is in the condition for precision weighing, the knife edges and notched seats of the coarse-weighing beam are inoperative.

If it is arranged that, when the balance is in the condition for preliminary weighing, the bearing pivots for the coarse-weighing beam and the bearing pivots for the fine-weighing beam are all in line, a common optical reading system can be used for coarse and precision scale indications.

Figure 2:
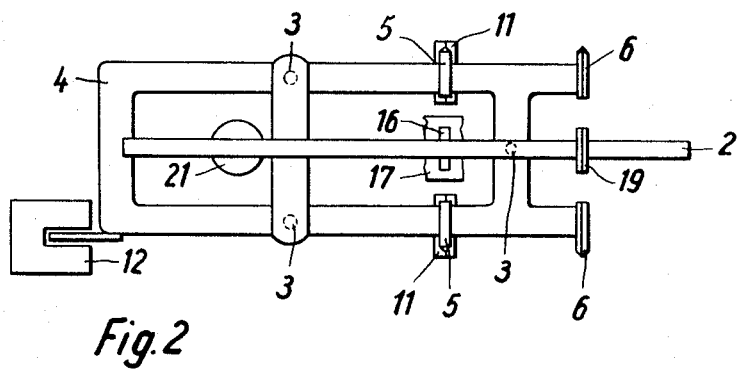
Figure 3:
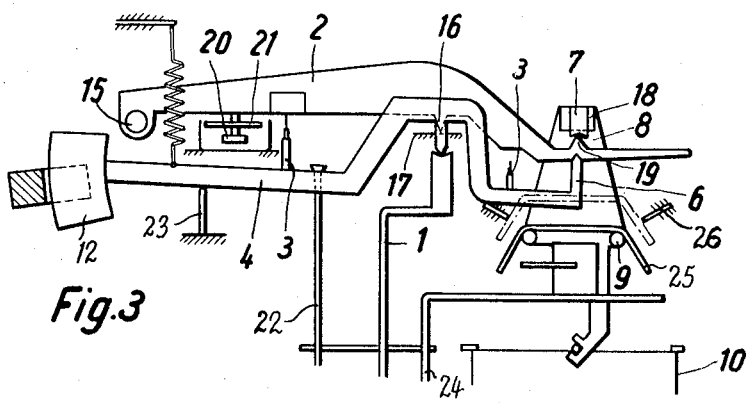

The invention is illustrated by way of example on the accompanying drawing, in which:

FIG. 1 is a diagrammatic part-sectional side elevation of the main parts of an analytical balance according to the invention, in the condition for preliminary weighing, FIG. 2 is a plan corresponding to FIG. 1, and FIG. 3 is a view similar to FIG. 1 but with the balance in the condition for precision weighing.

The balance illustrated can be changed to and from preliminary weighing and precision weighing conditions respectively by means of a changeover rod 1 which can be raised and lowered from below by its own individually operated cam (not shown). In the condition shown by FIG. 1, a fine-weighing beam 2 rests on three supporting screwed studs 3 on coarse-weighing beam 4 which has two pivot knife edges 5 borne by rod 1.

The load arm of the coarse-weighing beam 4 has a pair of upwardly directed knife edges 6 on which rest a pair of notched bearings 7 suspending a linkage 8 carrying a weight support 9 and a load pan 10.

The knife edges 5 rest in seat notches 11 on the rod 1 and the construction of the pivotal bearings 5, 11 and 6, 7 are of a known kind including stop pads and means to prevent unhinging (not shown).

The coarse-weighing beam 4 has a magnetic damper 12 and, optionally, may be kept in equilibrium by a tension spring 13, anchored at 14, for so-called negative force compensation of the relatively heavy balancing arm, i.e. the left arm as seen in the drawing, of the beam 4. The spring could be attached to the load arm to act downwardly, so-called positive force compensation, but the arrangement illustrated is preferred because the balancing arm has a greater leverage.

For preliminary weighing, in the condition shown in FIG. 1, the beams 2 and 4 act together as a spring-loaded inclination balance unit which can be read from a dial 15 through optical magnification and a focusing screen. All three knife edges 5 and 16 are in engagement with their bearings 11 and 17 for swinging about a common axis defined by the knife edges.

For precision weighing, in the condition shown in FIG. 3, the rod 1 is lowered to leave the beam 2 resting by a knife edge 16 on the flat seat 17 which is a fixed part of the balance structure. Between the bearings 7, the linkage 8 has another bearing 18 which, when the beam 4 is lowered with the rod 1, rests on a knife edge 19 on the load arm of the beam 2, the knife edges 6 being disengaged from the bearings 7. The load pan is now borne by the fine-weighing beam 2 alone and the beam 4 is inoperative.

The balancing arm of the beam 2 has a counterweight 20 and an air damper 21 and the beam 2 operates as an inclination balance which is read from the dial 15.

During precision weighing, the beam 4 is held at rest on a support 23 by a cam-operated pull-rod 22.

By means of a cam-operated pushrod 24, weights 25 can be raised from the support 9 and held up to stops 26. Thus, in a known manner, the weights 25 can be made operative or inoperative, to balance the load in preliminary weighing, and the weight values can be observed. Suitable mechanism for operating the rods 1, 22 and 24 and for weight adjustment is more fully described and illustrated in my U.S. Pat. application Ser. No. 699,489.

In accordance with an alternative feature of the invention, for coarse weighing, the rod 1 can be arranged to lift the bearings 11 and the beams sufficiently to cause the knife edge 16 of the beam 2 to be raised a fraction of a millimeter clear of the bearing 17. The resulting misalignment of the dial can be connected by the use of an optical element in the path of light coming from the scale 6 to the focusing screen, the element having two positions, one for coarse weighing and one for fine. By the raising of the knife edge 16 wear and tear on it is reduced.

The invention has been described as applied to a two-knife-edge beam balance but could be applied to a three-knife-edge beam balance.

I claim:

1. In a weighing balance, the combination comprising load-carrying means, a coarse-weighing beam for supporting the load during preliminary coarse weighing, bearing means for supporting said coarse-weighing beam, a fine-weighing beam for supporting the load during fine weighing, bearing means for supporting said fine-weighing beam, means for ganging together said two weighing beams for common swinging movement during coarse weighing of the load, said bearing means for supporting said coarse-weighing beam being mounted to be vertically movable for lifting said coarse-weighing beam, said ganging means including means for vertically moving said bearing means supporting said coarse-weighing beam for vertical movement of said coarse-weighing beam between an upper position in which said fine-weighing beam is carried on said coarse-weighing beam and a lower position in which said fine-weighing beam is supported pivotably on its bearing means, said bearing means for supporting said coarse-weighing beam being made in two parts placed on either side of said bearing means for supporting said fine-weighing beam.

2. In a weighing balance, the combination comprising load-carrying means, a coarse-weighing beam for supporting the load during preliminary coarse weighing, bearing means for supporting said coarse-weighing beam, a fine-weighing beam for supporting the load during fine-weighing, bearing means for supporting said fine-weighing beam, means for ganging together said two weighing beams for common swinging movement during coarse-weighing of the load, said bearing means for supporting said coarse-weighing beam being mounted to be vertically movable for lifting said coarse-weighing beams, said ganging means including means for vertically moving said bearing means supporting said coarse-weighing beam for vertical movement of said coarse-weighing beam between an upper position in which said fine-weighing beam is carried on said coarse-weighing beam and a lower position in which said fine-weighing beam is supported pivotably on its bearing means, and wherein during the coarse-weighing position said fine-weighing beam is lifted clear of its supporting bearing means.

3. A weighing balance comprising a coarse-weighing beam for supporting a load during coarse weighing, a fine-weighing beam for supporting the load during fine weighing, a measured value display, said fine-weighing beam being connected with said measured value display, respective bearing means for pivotably supporting each of said weighing beams, each of said weighing beams having means defining a point of engagement for the load, and means for placing both said weighing beams during coarse weighing in an engaged and rigid relationship with respect to one another so that said weighing beams no longer are able to pivot relative to one another.

4. A weighing balance as defined in claim 3, wherein said fine-weighing beam and said coarse-weighing beam are arranged above one another, said placing means serving to lay the said weighing beams on top of one another into said engaged and rigid relationship.

5. A weighing balance as defined in claim 4, wherein said placing means serves to vertically displace said bearing means of said coarse-weighing beam in order to raise said coarse-weighing beam into such an elevational position that said fine-weighing beam is lifted clear of its bearing means.

6. A weighing balance as defined in claim 5, wherein said fine-weighing beam is arranged above said coarse-weighing beam, said coarse-weighing beam bearing three support members for supporting said fine-weighing beam in said engaged and rigid relationship.

7. A weighing balance as defined in claim 5, wherein the elevational position assumed by said fine-weighing beam when lifted clear of its bearing means by said coarse-weighing beam is such that at this elevational position the point of engagement of said coarse-weighing beam for the load lifts the load off the respective point of engagement of said fine-weighing beam.

8. A weighing beam as defined in claim 5, wherein the pivot axis of said bearing means for supporting said coarse-weighing beam when in its lifted position is aligned with the pivot axis of said bearing means for supporting said fine-weighing beam.

9. A weighing beam as defined in claim 8, wherein said bearing means for supporting said coarse-weighing beam is constructed in two parts placed on either side of said bearing means for supporting said fine-weighing beam.

10. A weighing beam as defined in claim 3, wherein each of said weighing beams possesses a respective load arm having the same length.